United States Patent
Zheng et al.

(10) Patent No.: US 7,935,248 B2
(45) Date of Patent: May 3, 2011

(54) ADSORBENTS FOR DENITROGENATION DESULFURIZATION OF HYDROCARBON OILS AND METHODS OF PRODUCING

(75) Inventors: Ying Zheng, New Maryland (CA); Lingjun Chou, Lanzhou (CN)

(73) Assignee: The University of New Brunswick, Fredericton, NB (CA)

( * ) Notice: Subject to any disclaimer, the term of this patent is extended or adjusted under 35 U.S.C. 154(b) by 381 days.

(21) Appl. No.: 11/978,710

(22) Filed: Oct. 30, 2007

(65) Prior Publication Data

US 2009/0107882 A1     Apr. 30, 2009

(51) Int. Cl.
*C10G 29/04*     (2006.01)
*C10G 25/00*     (2006.01)

(52) U.S. Cl. ........ 208/295; 208/243; 208/244; 208/246; 208/247; 208/254 R; 208/296; 208/297; 208/299

(58) Field of Classification Search .............. 208/213, 208/254 R, 299, 246–248, 250, 296, 297, 208/243, 244, 249, 295; 502/210, 405
See application file for complete search history.

(56) References Cited

U.S. PATENT DOCUMENTS

| | | | |
|---|---|---|---|
| 3,904,550 A | 9/1975 | Pine | |
| 4,145,314 A | 3/1979 | Fung et al. | |
| 4,251,350 A | 2/1981 | Johnson et al. | |
| 4,588,706 A | 5/1986 | Kukes et al. | |
| 4,648,963 A | 3/1987 | Kutes et al. | |
| 4,762,814 A | 8/1988 | Parrott et al. | |
| 4,853,108 A | 8/1989 | Kemp | |
| 5,021,385 A * | 6/1991 | Daly et al. | ...... 502/211 |
| 5,039,644 A | 8/1991 | Lachman et al. | |
| 5,045,522 A | 9/1991 | Kidd | |
| 5,124,302 A | 6/1992 | Lachman et al. | |
| 5,135,902 A | 8/1992 | Delaney et al. | |
| 5,174,919 A | 12/1992 | Cymbaluk et al. | |
| 5,177,050 A | 1/1993 | Schubert | |
| 5,231,063 A | 7/1993 | Fukumoto et al. | |
| 5,360,468 A | 11/1994 | Schubert | |
| 6,471,923 B1 | 10/2002 | Becue et al. | |
| 7,094,333 B2 | 8/2006 | Yang et al. | |
| 2004/0007506 A1* | 1/2004 | Song et al. | ...... 208/244 |
| 2006/0040823 A1 | 2/2006 | Stockwell | |
| 2008/0099375 A1* | 5/2008 | Landau et al. | ...... 208/244 |

FOREIGN PATENT DOCUMENTS

WO          WO 01/23501    *  4/2001

OTHER PUBLICATIONS

"Science and technology of novel processes for deep desulfurization of oil refinery streams: a review", Babich et al, Elsevier Science Ltd 2002 pp. 607-631.

(Continued)

*Primary Examiner* — Walter D Griffin
*Assistant Examiner* — Renee Robinson
(74) *Attorney, Agent, or Firm* — Lynn C. Schumacher; Hill & Schumacher

(57) ABSTRACT

The present invention provides adsorbents for deep denitrogenation/desulfurization of hydrocarbon oils, and more particularly to an adsorbent material that selectively adsorbs organonitrogen and organosulfur from transportation fuels at room temperature and atmospheric pressure.

16 Claims, 2 Drawing Sheets

OTHER PUBLICATIONS

Ultra-deep desulfurization and denitrogenation of diesel fuel by selective adsorption over three different adsorbents: A study on adsorptive selectivity and mechanism, Kim et Elsevier B.V., 2005, pp. 74-83.

Denitrogenation of Transportation Fuels by Zeolites at Ambient Temperature and Pressure, Hernandez-Maldonado et al, Angewandte Chemie, 2004, pp. 1004-1006.

An overview of new approaches to deep desulfurization for ultra-clean gasoline, diesel fuel and jet fuel, Song, Elsevier B.V., 2003, pp. 211-263.

Oyama et al., Active phase of Ni2P/SiO2 in hydroprocessing reactions, Journal of Catalysis, 2004, pp. 263-273, vol. 221.

Sun et al., Dibenzothiophene hydrodesulfurization activity and surface sites of silica-supported MoP, Ni2P, and Ni-Mo-P catalysts, Journal of Catalysis, 2004, pp. 298-310, vol. 228.

* cited by examiner

ADSORBENTS FOR DENITROGENATION DESULFURIZATION OF HYDROCARBON OILS AND METHODS OF PRODUCING

FIELD OF THE INVENTION

The present invention generally relates to adsorbents, and methods of making them, for the denitrogenation/desulfurization of hydrocarbon oils, and more particularly to adsorbent materials that selectively adsorbs organonitrogen and organosulfur from transportation fuels at room temperature and atmospheric pressure.

BACKGROUND OF THE INVENTION

Increasing demands for distillate fuels and the decreasing supplies of lighter, easy-to-process crude are forcing refineries to process heavier stocks. The major problems encountered during the processing of these types of stocks are the higher nitrogen and sulfur contents, which on burning produce nitrogen and sulfur oxides (NOx and SOx), and cause serious environmental hazards.

The US Environmental Protection Agency (EPA) introduced regulations in 2000 that required the reduction of sulfur content of domestic gasoline from a previous maximum of 350 parts per million (ppm) to 30 ppm, to be phased in between 2004 and 2006 for all large refineries [1]. The EPA also introduced S15 (Ultra-Low Sulfur Diesel Fuel—ULSD) regulations requiring the reduction of highway diesel fuel sulfur down to 15 ppm beginning in June 2006; similar regulations were enacted in Canada [2]. Regulations were also enacted that required off-road diesel, locomotive, and marine fuel sulfur levels capped at 500 ppm by June 2007, with off-road diesel subsequently being capped at 15 ppm in 2010; even tougher regulations were enacted in the European Union and Japan [2]. Legislation has also led to a decrease of nitrogen in gasoline and diesel fuels.

Hydrodenitrogenation and hydrodesulfurization using hydrotreating catalysts, e.g., $NiMo/Al_2O_3$ and $CoMo/Al_2O_3$, is the conventional process currently being employed in refineries worldwide to remove organic nitrogen/sulfur compounds from liquid fuels. This process normally requires high temperatures, high pressure, and hydrogen consumption. The cost of hydrogen consumption represents about half of the operating costs of a refinery. The challenge that this conventional process faces is the new regulations announced by the U.S. Environmental Protection Agency (EPA) requiring the reduction of sulfur levels down to 30 weight part per million (ppmw) in gasoline and 15 ppmw in diesel as mentioned above. The current hydrodesulfurization process is effective to remove only the "easy sulfur" compounds but not the refractory sulfur compounds present in the liquid fuels. As well, although there is no limitation on nitrogen compounds, they compete with sulfur compounds on the active sites of catalysts in the conventional process. Therefore, nitrogen compounds should be removed as much as possible.

Meeting and exceeding the fuel specifications presents a significant challenge to petroleum refiners, who want to achieve this at the lowest possible cost. As well, though hydrotreating processes on hydrodenitrogenation (HDN) and hydrodesulfurization (HDS) have been significantly improved, it is still difficult to use the existing hydrotreating technology to remove the nitrogen and sulfur compounds to less than 15 ppm. This is partially due to the fact that the remaining nitrogen and sulfur compounds in commercial fuels are multi-ring nitrogen and sulfur compounds which are relatively difficult to remove [5,6].

U.S. Pat. No. 5,231,063 issued to Fukumoto et al. discloses a composite adsorbent containing acid salts of m- or p-aromatic amino acid and an acid used for removing aldehydes, amines and ammonia from a gas stream. When a transition metal is incorporated into the adsorbent, hydrogen sulphide can also be removed from the gas.

U.S. Pat. No. 4,145,314 issued to Fung et al. discloses methods of making highly dispersed metal catalysts using Group VIII metals and elemental phosphorous.

U.S. Pat. No. 5,045,522 issued to Kidd discloses an adsorbent for removing hydrogen sulphide from a fluid stream. The adsorbent includes zinc titanate, alumina and silica and metals from Group VIII along with phosphor, tungsten and molybdenum.

United States Patent Publication No. 2004/0007506 to Song et al. discloses methods and materials for the desulfurization of hydrocarbon fuels using a variety of materials such as transition metal chlorides, activated nickel absorbents, zeolites and the like.

U.S. Pat. No. 5,174,919 issued to Cymbaluk et al. discloses sulfur absorbents for removing sulfur from fluid streams. The absorbents include zinc oxide and a metal phosphate which may be from any of the following groups, Group IIA, Group IVB, Group IIIA and Group III.

United States Patent Publication No. 2006/0040823 to Stockwell discloses a catalytic additive for removal of NOx and SOx which includes an alkaline earth metal, phosphorous and a transition metal loaded on an alumina support.

U.S. Pat. Nos. 5,177,050 and 5,360,468 issued to Schubert discloses a sulfur absorbent composition which contains zinc oxide and alumina which is treated with a phosphating agent.

U.S. Pat. Nos. 5,039,644 and 5,124,302 issued to Lachman et al. disclose a monolithic ceramic structure used for supporting catalysts. The composition of the monolith includes alumina, titania, and/or zirconia and phosphate for stabilizing the metal oxide structure against thermal degredation during use as a catalyst support at high temperatures.

U.S. Pat. No. 3,904,550 issued to Pine discloses a hydrocarbon conversion catalyst support which includes alumina and aluminum phosphate.

U.S. Pat. No. 4,762,814 issued to Parrott et al. discloses a hydrocarbon conversion catalyst which includes alumina, zinc titanate, a molybdenum compound, a nickel or cobalt or both, and a compound containing phosphorous and oxygen. The catalyst is used for cleaning hydrocarbons to specifically remove compounds of nickel, vanadium and sulfur.

U.S. Pat. No. 6,471,923 issued to Becue et al. discloses materials for adsorbing and desorbing oxides of nitrogen (NO and $NO_2$) present in exhaust gases produced for example by internal combustion engines. The materials contain phosphate tetrahedral containing and element from Groups IVB, VB, VIIB, VIIB and IVA. Other elements may be included from the alkali elements, alkaline earth elements and transition metals.

U.S. Pat. No. 4,251,350 issued to Johnson et al. discloses a hydrocarbon catalyst containing alumina, a Group VIB or VIII metal, a phosphorous containing compound which is mixed with hydrous alumina and calcined during the process of making the catalyst.

U.S. Pat. Nos. 4,588,706 and 4,648,963 issued to Kutes et al. discloses a hydrocarbon catalyst for removing sulfur and nitrogen from hydrocarbons. The catalyst is made by mixing a metal oxide with the metal being from the Group VIB, with a Group VIII metal which is either iron, cobalt or nickel, and with phosphoric acid and then mixing the material with a alumina support material and then heating the mixture to dry it then heating in a non oxidizing and non reducing environment to activate the mixture.

U.S. Pat. No. 5,135,902 issued to Delaney et al. discloses a catalyst containing nickel, tungsten and phosphorous supported on a porous refractory oxide. The catalyst is designed to promote an aromatic saturation reaction.

U.S. Pat. No. 4,853,108 issued to Kemp discloses a catalyst containing incorporating elements selected from the group consisting of molybdenum, tungsten and mixtures thereof, and a stabilizing amount of phosphorus into an alumina hydrogel support.

Therefore there is a strong need for adsorbent materials that can selectively adsorb organonitrogen and organosulfur from transportation fuels at room temperature and atmospheric pressure, which does not require the presence of hydrogen if possible.

SUMMARY OF THE INVENTION

The present invention provides adsorbents for selectively adsorbing organonitrogen and organosulfur from hydrocarbon containing feed streams such as transportation fuels at room temperature, atmospheric pressure and in the absence of hydrogen, and methods of producing the adsorbents and methods of treating the hydrocarbon containing feed streams.

An embodiment of the present invention provides a process for adsorption of organosulfur and organonitrogen in a hydrocarbon containing feed stream comprising the step of intimately contacting a substantially liquid hydrocarbon containing feed stream, which also contains compounds of organosulfur and organonitrogen, with an adsorbent composition under such adsorption conditions as to produce a hydrocarbon containing stream having reduced levels of organosulfur and organonitrogen, wherein said adsorbent composition has been prepared by a process comprising the steps of:

a) mixing a phosphate solution with a sol gel of at least one transition metal oxide, in which a transition metal of the transition metal oxide is selected from the groups IIIB through IB of the periodic table;

b) drying the mixture at a temperature in a range from about 120° C. to about 200° C., calcining the dried powder at a temperature in a range from about 400° C. to about 650° C., to produce a calcined powder of a mixed metal phosphate;

c) applying a suitable reduction process to the calcined powder wherein the metal phosphates are converted into their corresponding metal phosphides, exposing the metal phosphides to an inert gas; and wherein in use as an adsorbent material for removal of organosulfur and organonitrogen, the metal phosphides are submerged, without exposure to air or oxygen, into the liquid hydrocarbon containing feed stream for selective removal of organonitrogen and organosulfur present in the liquid hydrocarbon containing feed stream.

Another embodiment of the present invention provides a process for adsorption of organosulfur and organonitrogen in a hydrocarbon containing feed stream comprising the step of intimately contacting a substantially liquid hydrocarbon containing feed stream, which also contains compounds of sulfur and nitrogen, with an adsorbent composition under such adsorption conditions as to produce a hydrocarbon containing stream having reduced levels of organosulfur and organonitrogen, wherein said adsorbent composition has been prepared by a process comprising the steps of:

a) impregnating a porous support material with at least one transition metal salt and a phosphoric salt or a metaphosphoric salt or any combination thereof, the transition metal of the transition metal salt being selected from the group consisting of group IIIB through group IB of the periodic table;

b) drying the impregnated porous support material and calcining the impregnated porous support at a temperature in a range from about 400° C. to about 650° C. to produce a calcined powder of a mixed metal phosphate;

c) applying a suitable reduction process to the calcined powder in the porous support wherein the mixed metal phosphates are converted into their corresponding metal phosphides, and quenching by exposing the metal phosphides to an inert gas for cooling; and wherein in use as an adsorbent material for removal of organosulfur and organonitrogen, the metal phosphides are submerged, without exposure to air or oxygen, into the liquid hydrocarbon containing feed stream at ambient pressure for selective removal of organonitrogen and organosulfur present in the liquid hydrocarbon containing feed stream.

Another embodiment of the present invention provides a process for adsorption of organosulfur and organonitrogen in a hydrocarbon containing feed stream comprising the step of intimately contacting a substantially liquid hydrocarbon containing feed stream, which also contains compounds of sulfur and nitrogen, with an adsorbent composition under such adsorption conditions as to produce a hydrocarbon containing stream having reduced levels of organosulfur and organonitrogen, wherein said adsorbent composition has been prepared by a process comprising the steps of:

a) mixing a transition metal phosphate solution with a sol gel of a porous support material, the transition metal being selected from the group consisting of group IIIB through group IB of the periodic table;

b) drying the mixture of the transition metal phosphate solution and sol gel of the porous support material, and calcining the mixture at a temperature in a range from about 400° C. to about 650° C. to produce a calcined powder of metal phosphates embedded in a porous support formed by the sol gel during drying of the mixture;

c) applying a suitable reduction process to the calcined powder in the porous support wherein the metal phosphates are converted into their corresponding metal phosphides, and exposing the metal phosphides to an inert gas; and wherein in use as an adsorbent material for removal of organosulfur and organonitrogen, the metal phosphides are submerged, without exposure to air or oxygen, into the liquid hydrocarbon containing feed stream for selective removal of organonitrogen and organosulfur present in the liquid hydrocarbon containing feed stream.

A further understanding of the functional and advantageous aspects of the invention can be realized by reference to the following detailed descriptions and drawings.

BRIEF DESCRIPTION OF THE DRAWINGS

The invention will be more fully understood from the following detailed descriptions thereof taken in connection with the accompanying drawings, which form a part of this application, and in which.

DETAILED DESCRIPTION OF THE INVENTION

Figure 1:
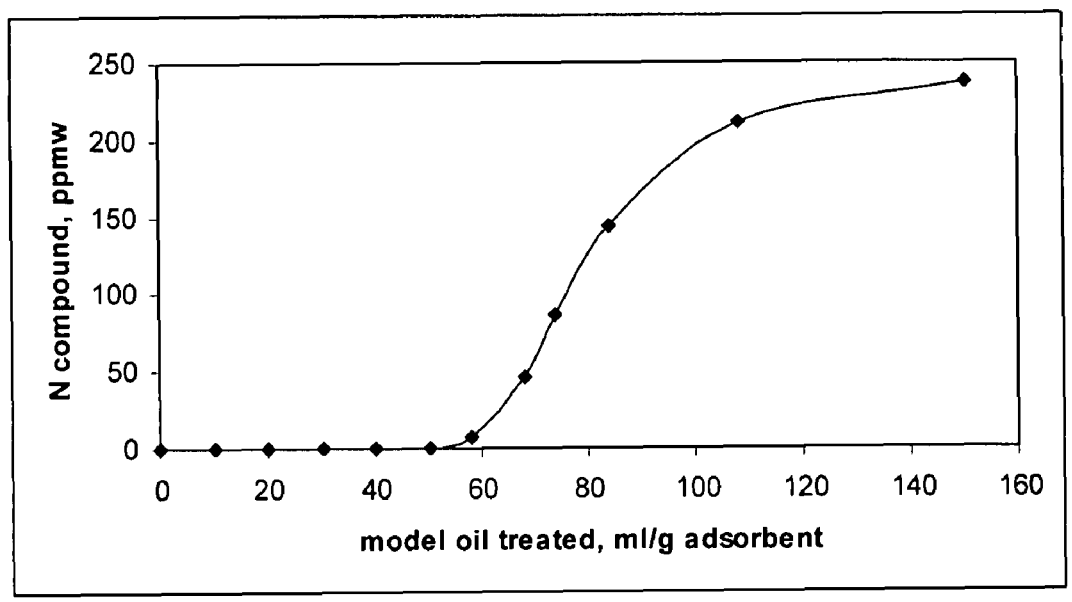
FIG. 1 shows a break-through curve for adsorptive denitrogenation of model diesel fuel over WP/TiO$_2$—ZrO$_2$ at 23° C., LHSV=3 h$^{-1}$; where WP is tungsten phosphide and LHSV means liquid hourly space velocity.

The systems described herein are directed, in general, to embodiments of adsorbent materials that selectively adsorb organonitrogen and organosulfur from hydrocarbon liquids. Although embodiments of the present invention are disclosed herein, the disclosed embodiments are merely exemplary in nature.

Therefore, specific structural and functional details disclosed herein are not to be interpreted as limiting but merely as a basis for the claims and as a representative basis for enabling someone skilled in the art to employ the present invention in a variety of manners. For purposes of instruction and not limitation, the illustrated embodiments are all directed to adsorbent materials that selectively adsorb organonitrogen and organosulfur from hydrocarbon liquids.

As used herein, the term "about", when used in conjunction with ranges of concentrations, temperatures or temperature ranges, dimensions or pressures or other physical properties or characteristics, is meant to cover slight variations that may exist in the upper and lower limits of the ranges of dimensions or pressures so as to not exclude embodiments where on average most of the dimensions are satisfied but where statistically dimensions may exist outside this region. It is not the intention to exclude embodiments such as these from the present invention.

The present invention relates to an adsorbent material for the removal of organonitrogen and organosulfur from hydrocarbon oils. The adsorbent materials include transition metal phosphides. The precursors of phosphides (denoted as precursor hereafter) are composed of at least one phosphate and at least one transition metal salt. The transition metal is selected from the groups IIIB through IB of the periodic table. The precursors are not active in the form of their oxides until a suitable reduction procedure is applied. Upon application of the reduction procedure, the oxides are converted into their corresponding metal phosphides. The starting materials may include more than one transition metal so that the final metal phosphide may be a mixed metal phosphide.

The final product may contain one or more than one transition metal phosphides. In the case where a transition metal oxide is not selected as the substrate (e.g. zeolites, Al$_2$O$_3$ are used as the substrate), the final product may contain only one transition metal phosphide. On the other hand, if transition metal oxides such as TiO$_2$ are selected as the substrate, the final product will contain more than one transition metal phosphide.

There are three methods disclosed herein to generate the metal phosphide adsorbent material. In the first, the precursor, which contains at least one transition metal, is dried, calcined and reduced to a metal phosphide adsorbent using the reduction procedure described below. In the second method, the precursor is uploaded onto a porous supporting material made of transition metal oxide(s). After the proper reduction procedure, the uploaded precursor is converted into the corresponding metal phosphide and part of or all of the transition metal oxide supporting material may also be converted into a phosphide. In this embodiment, the transition metal containing porous supporting material may also serve as active adsorbent materials.

In a third method, the precursor containing transition metals is first uploaded onto porous materials other than transition metal oxide containing support, and may include materials such as silica zeolites or active carbon, and then reduced to phosphides.

In a first embodiment of the adsorbent, when no porous supporting materials are used, the adsorbent material is made using transition metal oxides and a suitable amount of phosphoric salts or metaphosphoric salts only.

As mentioned above, in the second and third embodiments, a porous supporting material is used. The difference between the second and the third embodiment is the type of supporting material used. In the second embodiment, the transition metal containing supporting material not only provides a large surface area to anchor the uploaded precursor but it is also partially or entirely converted to transition metal phosphides in the reduction process. The transition metal phosphides will function in selective adsorption of organonitrogen and organosulfur compounds of hydrocarbon oil. In the third embodiment, the role of the supporting material is only to house the uploaded precursor.

In the second and third embodiments, the amount of transition metal oxides of the precursor is preferably from about 5 to about 50% by weight based on the weight of supporting material. If the amount of the transition metals is less than this defined range, an adsorbent of high activity cannot be obtained. If, on the other hand, the amount is more than this defined range, the pores of the support materials will become clogged with the active metals, so that the internal diffusion of the hydrocarbon oil as applied to the adsorbent material is impaired and the adsorption capacity is lowered. For phosphorus, any form of phosphoric salt or metaphosphoric salt may be used. The suitable amount of the phosphorus varies with the transition metal used.

Synthesis Procedure

An embodiment of a synthesis procedure of the adsorbent material is as follows. In the first embodiment, in which support materials are not used, a phosphate aqueous solution (such as but not limited to diammonium hydrogen phosphate) is combined with a sol gel of one or more transition metal oxides after which the mixture is dried at a temperature in a range from about 120 to about 200° C. for about 10 to about 15 hours. The dried powder is then calcined at a temperature in a range from about 400 to about 650° C., preferably at 550° C. The adsorbent material is obtained after the dry powder is temperature-programmedly reduced in hydrogen flow to a final temperature in a range from about 550° C. to about 850° C. for 4 hours and quenched by nitrogen or helium gas. Without allowing contact with air/oxygen, the obtained adsorbent material is then submerged into the hydrocarbon stream and then organonitrogen and organosulfur are selectively removed.

In embodiments of the adsorbent materials using porous substrate supports, three approaches to the synthesis are disclosed herein. In the first approach, transition metal salts and phosphoric salts, or metaphosphoric salts, are combined in a sufficient amount of distilled water to form a clear solution. The porous support material is then impregnated with this solution. The porous support material bearing the transition metal phosphates is dried under a temperature in a range from about 120 to about 200° C. for about 10 to 15 hours. The solvent is evaporated while the transition metal and phosphate compounds deposit on the interior of the porous support material. The dried power is then calcinated at a temperature in a range from about 400 to about 650° C. followed by temperature-programmed reduction in hydrogen flow to a final temperature in a range from about 550° C. to about 850° C. for 4 hours and quenched by nitrogen or helium gas. The possible porous support materials may include, but are not limited to, transition metal oxides (such as $V_2O_5$, ZnO, $TiO_2$, $ZrO_2$), zeolites, silica alumina, $SiO_2$, $Al_2O_3$, and activated carbon.

The second approach is to impregnate the porous support material with a transition metal salt solution and phosphoric salt, or metaphosphoric salt solution, in sequence. Preferably, the porous support material is impregnated with a phosphoric salt solution (or metaphosphoric salt solution) first followed by a transition metal salt solution. The drying, calcination and reduction procedure is the same as described above.

The third approach includes blending a transition metal phosphate solution with a sol gel of the supporting material, then drying the mixture at a temperature in a range from about 120 to about 200° C. for 10 to 15 hours. The dried powder is then calcinated at a temperature in a range from about 400 to about 650° C. followed by temperature-programmed reduction in a hydrogen flow to a final temperature in a range from about 550 to about 850° C. for 4 hours and quenched by nitrogen or helium gas. In this third approach, the transition metal phosphate solution is blended or mixed with the sol gel of a support material prior to the support material being dried to form the porous solid support. The porous support material may include transition metal oxides (such as $V_2O_5$, $TiO_2$, $ZrO_2$), zeolites, silica alumina, $SiO_2$, and $Al_2O_3$. When the mixture is dried, solvent is evaporated, the sol gel of the support is converted to a porous solid and the transition metal phosphates are deposited on the support material, which are then converted to the their corresponding metal phosphides upon reduction.

Then, the adsorbent material obtained using the above procedure, without being allowed to come into contact with air/oxygen, is submerged into the hydrocarbon oil feed stream at room temperature and atmospheric pressure. The organonitrogen and organosulfur of hydrocarbon oil can be selectively removed.

The adsorbent materials disclosed herein use transition metal phosphides as the active site for the adsorptive removal of S and N compounds from hydrocarbon liquid. Advantageously, the transition metal phosphides can be used as an adsorbent material with or without a supporting material or matrix. In addition, adsorptive denitrogenation and desulfurization can be performed at room temperature and at atmospheric pressure, and there is no need for the use of hydrogen. The adsorbent material has strong selectivity, so the yield of hydrocarbon liquid is quite high. The adsorbent material has excellent regenerability.

The adsorbent material in the present invention can selectively remove both nitrogen and sulfur compounds at room temperature and atmospheric pressure and no hydrogen is required. The technique will allow refineries to produce qualified liquid fuels in a cost-effective way.

Once transition metal phosphides are formed, the adsorbent material should not have contact with air/oxygen.

The adsorbents disclosed herein have several advantages over present adsorbents currently in use. First, the adsorption process using these adsorbents can very advantageously be performed at room temperature and at atmospheric pressure, and there is no need for the extensive use of hydrogen.

The process allows for the increased utilization of lower quality diesel fractions in the production of diesel, with resulting lower production costs. Further, the state of art reported for adsorbents is the removal of 3.5 mg of Nitrogen per gram of adsorbent at breakthrough point [12]; while studies conducted by the inventors on the adsorbents disclosed herein have resulted in the removal of 8.5 mg of nitrogen per gram of adsorbent, equivalent to 3.2 μmol $N/m^2$. Similarly, the state of art [13] reported for adsorbents is the removal of 20-30 mg of Sulfur per gram of adsorbent; tests with adsorbents disclosed herein have resulted in the removal of up to 55 mg of sulfur per gram of adsorbent The adsorbent disclosed herein which selectively adsorbs organonitrogen and organosulfur from transportation fuels at room temperature is of particular interest to refineries interested in economically reducing sulfur and nitrogen levels in domestic gasoline and highway diesel fuel.

The present invention will now be illustrated using the following examples and it will be understood that these examples are merely for illustrative purposes and are not meant to be limiting in any way.

Example 1

Treatment of a Model Diesel Fuel with $WP/TiO_2$—$ZrO_2$ $WP/TiO_2$—$ZrO_2$ adsorbent material is made as described above. The adsorbent has 15 wt % loading of WP on $TiO_2$—$ZrO_2$. $WP/TiO_2$—$ZrO_2$ adsorbent is grinded and sieved into 20-40 meshes. 3 ml of the grinded $WP/TiO_2$—$ZrO_2$ is packed into a glass column that has an inner diameter of 1 cm. Model diesel fuel is pumped into the column at room temperature and ambient pressure. The untreated and eluted model diesel fuel were analyzed using a Shimadzu GC-17A v3 unit equipped with an SLB-5 ms capillary column (L=30 m; i.d.=0.25 mm; film thickness=0.25 μm) and a hydrogen flame ionization detector with a temperature programming. The untreated model diesel contains 150 ppmw sulfur (4,6-dimethyldibenzothiophene, 4,6-DMDBT), 250 ppmw nitrogen (pyridine) and 20% 1-methylnaphthalene. The results are shown in FIG. 1. No nitrogen (N<1 ppm) is detected in the eluted model diesel below 52 ml. It shows the nitrogen compound pyridine is removed. Beyond 52 ml of eluted model diesel fuel, the nitrogen concentration increases as the eluted volume of model diesel fuel increases. When the eluted model diesel fuel reaches 110 ml, the nitrogen concentration in the eluted fuel is close to that of untreated model fuel. This shows the adsorbent is saturated by nitrogen.

Example 2

Figure 2:
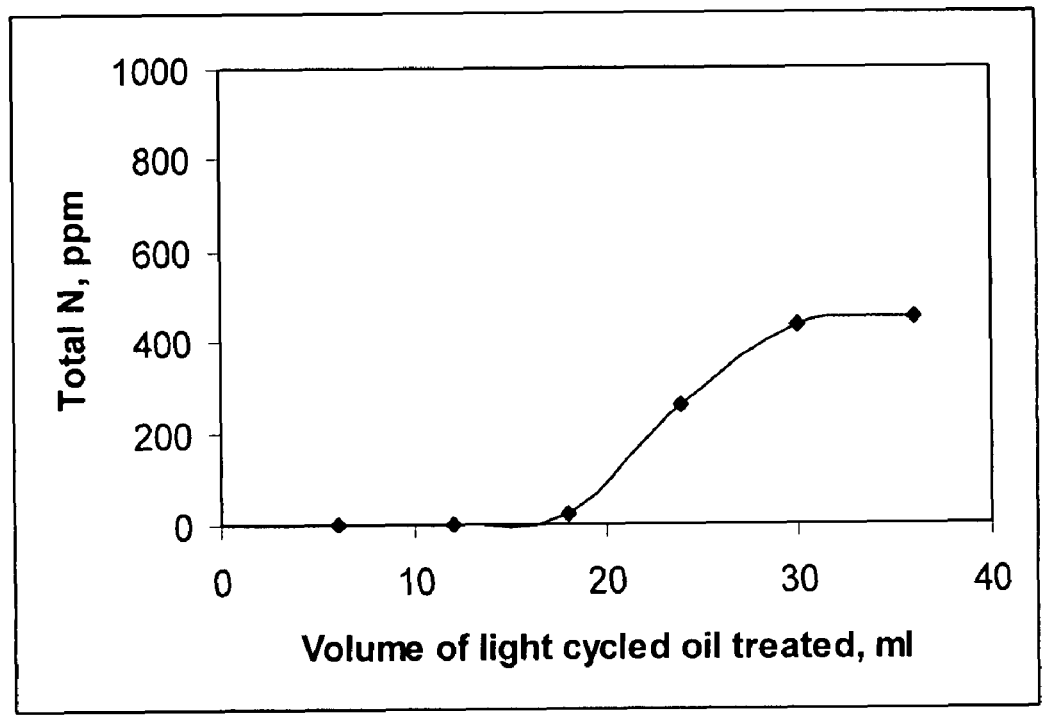
FIG. 2 shows a break-through curve for adsorptive denitrogenation of light cycle oil over NiP/TiO$_2$—ZrO$_2$ at 23° C., LHSV=3 h$^{-1}$, (initial N concentration=546 ppm)
Figure 3:
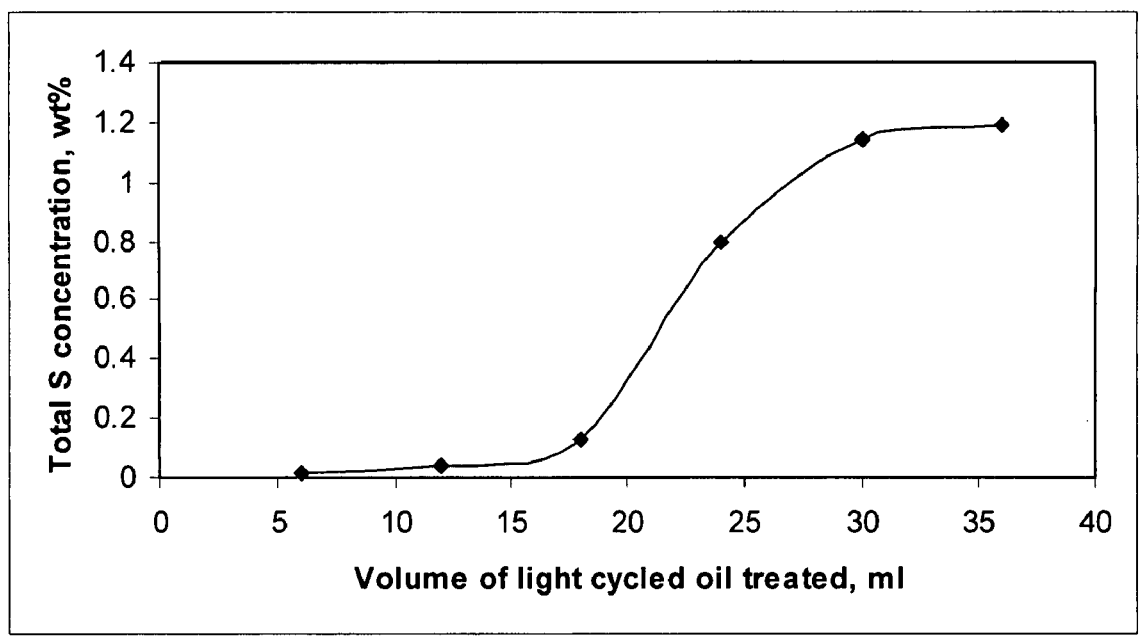
FIG. 3 shows a break-through curve for adsorptive desulfurization of light cycle oil over NiP/TiO$_2$—ZrO$_2$ at 23° C., LHSV=3 h$^{-1}$, (initial S concentration=1.3%).

Treatment of Real Light Cycled Oil (LCO) with $Ni_2P/TiO_2$—$ZrO_2$ $Ni_2P/TiO_2$—$ZrO_2$ adsorbent material is made as described above. Support material TiO2-ZrO2 was impregnated in the aqueous solution of $(NH_4)_2HPO_4$ and $Ni(NO_3)_2$. The loading level is 10 wt %. Then, the mixture is dried, calcined and reduced to $Ni_2P/TiO_2$—$ZrO_2$. The adsorbent material is grinded and sieved into 20-40 meshes. 3 ml of the grinded $WP/TiO_2$—$ZrO_2$ is packed into a column that has an inner diameter of 1 cm. Light cycled oil is pumped into the column at a liquid hourly space rate of 3 $h^{-1}$ at room temperature and ambient pressure. The untreated and eluted light cycled oil were measured according to ASTM D4629, ASTM D4294 and ASTM D6591. The untreated light cycled oil contains 546 ppmw nitrogen and 1.3% sulfur. The results are shown in FIGS. 2 and 3 and summarized in Table 1. Specifically, FIG. 2 shows a break-through curve for adsorptive denitrogenation of light cycle oil over $NiP/TiO_2$—$ZrO_2$ at 23° C., LHSV=3 $h^{-1}$, (initial N concentration=546 ppm) and FIG. 3 shows a break-through curve for adsorptive desulfurization of light cycle oil over $NiP/TiO_2$—$ZrO_2$ at 23° C., LHSV=3 $h^{-1}$, (initial S concentration=1.3%). The breakthrough capacity calculated from integration of the breakthrough curve is 3.66 mg N/g adsorbent. The adsorption capacity for sulfur compounds at saturation point is about 0.1 g/g.

TABLE 1

| Volume of LCO treated (ml) | Outlet nitrogen content (ppmw) | Outlet sulfur content (%) |
|---|---|---|
| 6 | 0 | 0.02 |
| 12 | 0 | 0.04 |
| 18 | 22 | 0.13 |
| 24 | 260 | 0.8 |
| 30 | 436 | 1.13 |
| 36 | 452 | 1.19 |

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

REFERENCES

[1] American Petroleum Institute: US Refining Industry: A system stretched to the limit. Found at: http://api-ep.api.org/industry/index.cfm?objectid=5C1AE70F-0129449FA6CEF327E2A0000F&method=display_body&er=1&bitmask=002007004000000000. Last accessed Jun. 13, 2006.

[2] New S15 (Ultra Low Sulfur Diesel—ULSD) Regulations. Found at: http://www.chevron.com/products/prodserv/fuels/diesel/ulsd.shtml. Last accessed Jun. 13, 2006.

[3] Canadian Association of Petroleum Producers: Industry Facts and Information. Found at: http://www.capp.ca/default.asp?V_DOC_ID=603. Last accessed Jun. 13, 2006.

[4] Canadian Association of Petroleum Producers. CAPP releases 2006 Canadian Crude Oil Forecast. Found at http://www.capp.ca/default.asp?V_DOC_ID=1169. Last accessed Jun. 13, 2006.

[5] C. Song, *Catal. Today,* 86 (2003), 211.

[6] I. V, Dabich, J. A Moulijin, *Fuel,* 82 (2003), 607

[7] Physorg.com: Science, Technology, Physics, Space News. "$2 billion market in nanopore" Found at: http://www.physorg.com/news5208.html. Last accessed Jun. 13, 2006.

[8] Blumberq, K., Walsh, M., and Pera, C. "Low Sulphur Gasoline & Diesel: The Key to Lower Vehicle Emissions" Found at: http://www.walshcarlines.com/pdf/low_sulfur_gasoline and 855.pdf. Last accessed Jun. 13, 2006.

[9] http://www.irvingoil.com/company/refinery.asp. Last accessed Jun. 13, 2006.

[10] http://www.irvingoil.com/company/media.asp. Television Commercial: Hamster Ad. Last accessed Jun. 13, 2006.

[11] http://www.uop.com/. Last accessed Jun. 13, 2006.

[12] A. J. Hernandez-Maldonado and R T. Yang, Angew. Chem. Int. Ed. 2004, 43, 1004-1004.

[13] J. H. Kim, X. Ma, A. Zhou, C. Song, Catalysis Today 111 (2006) 74-83

Therefore what is claimed is:

1. A process for adsorption of organosulfur and organonitrogen in a hydrocarbon containing feed stream comprising the steps of:
   a) mixing a phosphate solution with a sol gel of at least one transition metal oxide, in which a transition metal of the transition metal oxide is selected from the groups IIIB through IB of the periodic table;
   b) drying the mixture at a temperature in a range from about 120° C. to about 200° C., calcining the dried powder at a temperature in a range from about 400° C. to about 650° C., to produce a calcined powder of a mixed metal phosphate;
   c) applying a suitable reduction process to the calcined powder wherein the metal phosphates are converted into their corresponding metal phosphides, exposing the metal phosphides to an inert gas to produce a metal phosphide adsorbent composition; and
   d) flowing the hydrocarbon containing feed stream through a column containing the metal phosphide adsorbent composition, without exposure to air or oxygen, at ambient pressure and temperature for selective adsorptive removal of organonitrogen and organosulfur present in the liquid hydrocarbon containing feed stream to produce a hydrocarbon containing stream having reduced levels of organosulfur and organonitrogen.

2. The method according to claim 1 wherein step c) of applying a suitable reduction process includes reducing the calcined powder in a hydrogen flow to a final temperature of 550° C. to 850° C. for 4 hours, and wherein said inert gas is nitrogen or helium.

3. The method according to claim 1 wherein calcining the dried powder in step b) is for about 10 to about 15 hours at 550° C.

4. The method according to claim 1 wherein said adsorbent composition is any one of $WP/TiO_2ZrO_2$ and $NiP/TiO_2—ZrO_2$.

5. A process for adsorption of organosulfur and organonitrogen in a hydrocarbon containing feed stream comprising the steps of:
   a) impregnating a porous support material with at least one transition metal salt and a phosphoric salt or a metaphosphoric salt or any combination thereof, the transition metal of the transition metal salt-being selected from the group consisting of group IIIB through group IB of the periodic table;
   b) drying the impregnated porous support material and calcining the impregnated porous support at a temperature in a range from about 400° C. to about 650° C. to produce a calcined powder of a mixed metal phosphate;
   c) applying a suitable reduction process to the calcined powder in the porous support wherein the mixed metal phosphates are converted into their corresponding metal phosphides, and quenching by exposing the metal phosphides to an inert gas for cooling to produce a metal phosphide adsorbent composition; and
   d) flowing the hydrocarbon containing feed stream through a column containing the metal phosphide adsorbent composition, without exposure to air or oxygen, at ambient pressure and temperature for selective adsorptive removal of organonitrogen and organosulfur present in the liquid hydrocarbon containing feed stream to produce a hydrocarbon containing stream having reduced levels of organosulfur and organonitrogen.

6. The method according to claim 5 wherein said support material is selected from the group consisting of transition metal oxides, zeolites, silica alumina, $SiO_2$, and $Al_2O_3$.

7. The method according to claim 6 wherein said transition metal oxides are selected from the group consisting of $V_2O_5$, $TiO_2$, and $ZrO_2$.

8. The method according to claim 5 wherein said step a) of impregnating a porous support made with transition metal salt and a phosphoric salt or a metaphosphoric salt or any combination thereof includes combining at least one transition metal salt with a phosphoric salt or metaphosphoric salt, in water to produce a clear solution and impregnating the porous support using with said clear solution.

9. The method according to claim 5 wherein said step a) of impregnating a porous support made with at least one transition metal salt and a phosphoric salt or a metaphosphoric salt or any combination thereof includes impregnating the porous support with a phosphoric salt solution, a or metaphosphoric salt solution, first, followed by impregnating the porous support with a transition metal salt solution.

10. The method according to claim 5 wherein step c) of applying a suitable reduction process includes reducing the calcined powder in a hydrogen flow to a final temperature of 550° C. to 850° C. for 4 hours, and wherein said inert gas is nitrogen or helium.

11. The method according to claim 5 wherein an amount of transition metal oxides of the mixed metal phosphate is in a range from about 5 to about 50% by weight based on a weight of the porous supporting material.

12. A process for adsorption of organosulfur and organonitrogen in a hydrocarbon containing feed stream comprising the steps of:
a) mixing a transition metal phosphate solution with a sol gel of a porous support material, the transition metal of the transition metal phosphate being selected from the group consisting of group IIIB through group IB transition metals of the periodic table;
b) drying the mixture of the transition metal phosphate solution and sol gel of the porous support material, and calcining the mixture at a temperature in a range from about 400° C. to about 650° C. to produce a calcined powder of metal phosphates embedded in a porous support formed by the sol gel during drying of the mixture;
c) applying a suitable reduction process to the calcined powder in the porous support wherein the metal phosphates are converted into their corresponding metal phosphides, and exposing the metal phosphides to an inert gas to produce a metal phosphide adsorbent composition; and
flowing the hydrocarbon containing feed stream through a column containing the metal phosphide adsorbent composition, without exposure to air or oxygen, at ambient pressure and temperature for selective adsorptive removal of organonitrogen and organosulfur present in the liquid hydrocarbon containing feed stream to produce a hydrocarbon containing stream having reduced levels of organosulfur and organonitrogen.

13. The method according to claim 12 wherein an amount of transition metal oxides of the metal phosphate is in a range from about 5 to about 50% by weight based on a weight of the porous supporting material.

14. The method according to claim 13 wherein step c) of applying a suitable reduction process includes reducing the calcined powder in a hydrogen flow to a final temperature of to 550° C. to 850° C. for 4 hours, and wherein said inert gas is nitrogen or helium.

15. The method according to claim 13 wherein said sol gel of a porous support material are selected to give a porous support material selected from the group consisting of transition metal oxides, zeolites, silica alumina, $SiO_2$, and $Al_2O_3$.

16. The method according to claim 15 wherein said transition metal oxides are selected from the group consisting of $V_2O_5$, $TiO_2$, and $ZrO_2$.

* * * * *